US012807333B2

(12) United States Patent
Ogino

(10) Patent No.: US 12,807,333 B2
(45) Date of Patent: Nov. 24, 2026

(54) FLYING OBJECT MONITORING SYSTEM

(71) Applicant: KABUSHIKI KAISHA TOSHIBA, Kawasaki (JP)

(72) Inventor: Yoshihiro Ogino, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 0 days.

(21) Appl. No.: 18/830,675

(22) Filed: Sep. 11, 2024

(65) Prior Publication Data

US 2025/0083837 A1 Mar. 13, 2025

(30) Foreign Application Priority Data

Sep. 13, 2023 (JP) ................................ 2023-148678
Jun. 7, 2024 (JP) ................................ 2024-093252

(51) Int. Cl.
*B64F 5/60* (2017.01)
*G01S 13/89* (2006.01)

(52) U.S. Cl.
CPC ................ *B64F 5/60* (2017.01); *G01S 13/89* (2013.01)

(58) Field of Classification Search
CPC ....................................................... G01S 13/89
See application file for complete search history.

(56) References Cited

U.S. PATENT DOCUMENTS 10,209,122 B1 * 2/2019 Suddreth ................ G01H 17/00
2019/0253611 A1 * 8/2019 Wang ..................... H04N 23/62
2020/0258039 A1 8/2020 Burch, V et al.
2022/0269267 A1 * 8/2022 Lesonen .............. G05D 1/0038
2023/0035682 A1 * 2/2023 Seo ........................ G05D 1/101

FOREIGN PATENT DOCUMENTS

CN 201355449 Y 12/2009
CN 105843245 A 8/2016
CN 111781946 A 10/2020
JP 2018-165115 A 10/2018
JP 2020-57944 A 4/2020
JP 2021-43598 A 3/2021
JP 2022-141240 A 9/2022
JP 2023-51403 A 4/2023
TW M563394 U 7/2018

OTHER PUBLICATIONS

Taiwanese Office Action issued on Dec. 3, 2025 in Taiwanese Patent Application No. 113134656, 7 pages.

* cited by examiner

*Primary Examiner* — Tan Q Nguyen
(74) *Attorney, Agent, or Firm* — Oblon, McClelland, Maier & Neustadt, L.L.P.

(57) ABSTRACT

According to one embodiment, a flying object monitoring system comprises a reception unit which receives flight information of a flying object, a calculation unit which calculates acceleration in each flight direction of the flying object from the flight information, a representation unit which represents the calculated acceleration with an acceleration distribution image formed by plotting the calculated acceleration with respect to the flight direction, and a determination unit which determines whether the flying object is malfunctioning based on the acceleration distribution image.

5 Claims, 9 Drawing Sheets

Flying straight

Hovering

Flying unsteadily in every directions

Small change in movement in vertical direction (stable)

Large change in movement in vertical direction (unstable)

Malfunctioning drone

Suspicious drone

FLYING OBJECT MONITORING SYSTEM

CROSS-REFERENCE TO RELATED APPLICATIONS

This application is based upon and claims the benefit of priority from prior Japanese Patent Applications No. 2023-148678, filed Sep. 13, 2023 and No. 2024-093252, filed Jun. 7, 2024, the entire contents of which are incorporated herein by reference.

FIELD

Embodiments described herein relate generally to a flying object monitoring system for monitoring a flying object such as a drone.

BACKGROUND

In recent years, there has been an increase in the use of all drones personal, commercial and military.

Accordingly, the development of Unmanned Aircraft System (UAS) Traffic Management (UTM) is progressing. The UTM is a drone traffic management system adopted by ISO 23629-5 UAS traffic management (UTM)—Part 5: UTM functional structure. It is thus essential to link with the UTM for future drone flights. This linkage with UTM allows registration information to be obtained and thus information about airspace containing officially registered drones can be obtained.

The information that can be obtained by the UTM includes, for example, flightable airspace information, manned aircraft air traffic control system information, aircraft information of drones in flight, operator information, position information of drones in flight, incident information of drones, accident information, weather information and map information.

In addition to the UTM, a function of transmitting remote IDs to drones was made mandatory in June 2022. The drones thus fly while transmitting the remote IDs.

The information that can be obtained by the remote IDs includes, for example, a registration number, a product serial number, position information such as latitude and longitude, speed, an altitude and time.

As described above, information about drones currently in flight can be obtained through the remote IDs in addition to the UTM.

However, the drone information obtained from the UTM and remote IDs is based on the assumption that drones do not malfunction, that is, drones are not troubled but are flying normally.

No drones can fly normally or can obtain reliable information from the UTM or the remote IDs if there are mechanical failures such as breakage of a drone, switch malfunctioning and a break in wire, interruption of communications with operators, control software bugs, failures of various sensors or the like not related to remote ID transmission, battery malfunctioning such as loss of power, partly insufficient remote ID information (e.g., flight time inconsistency), and the like.

However, a drone which is registered or whose remote ID is known can only be treated as a normal one even if the drone is malfunctioning and not operating normally. Even if a drone is troubled or the like, the trouble cannot be detected. There is a danger that a crash possibility or the like cannot be detected in advance.

It is therefore necessary to have a health check function of checking whether a drone is malfunctioning. However, the health check cannot be performed only from the UTM, information such as remote IDs, or the like. The drone health check can be performed, for example, by displaying a drone trajectory to confirm whether the drone is flying stably. If, however, a large number of drones are flying, their trajectories may overlap and thus cannot be identified. Thus, the drone health check is not always effective.

As is seen from the above, it is not easy to detect malfunctioning drones.

DETAILED DESCRIPTION

Figure 1:
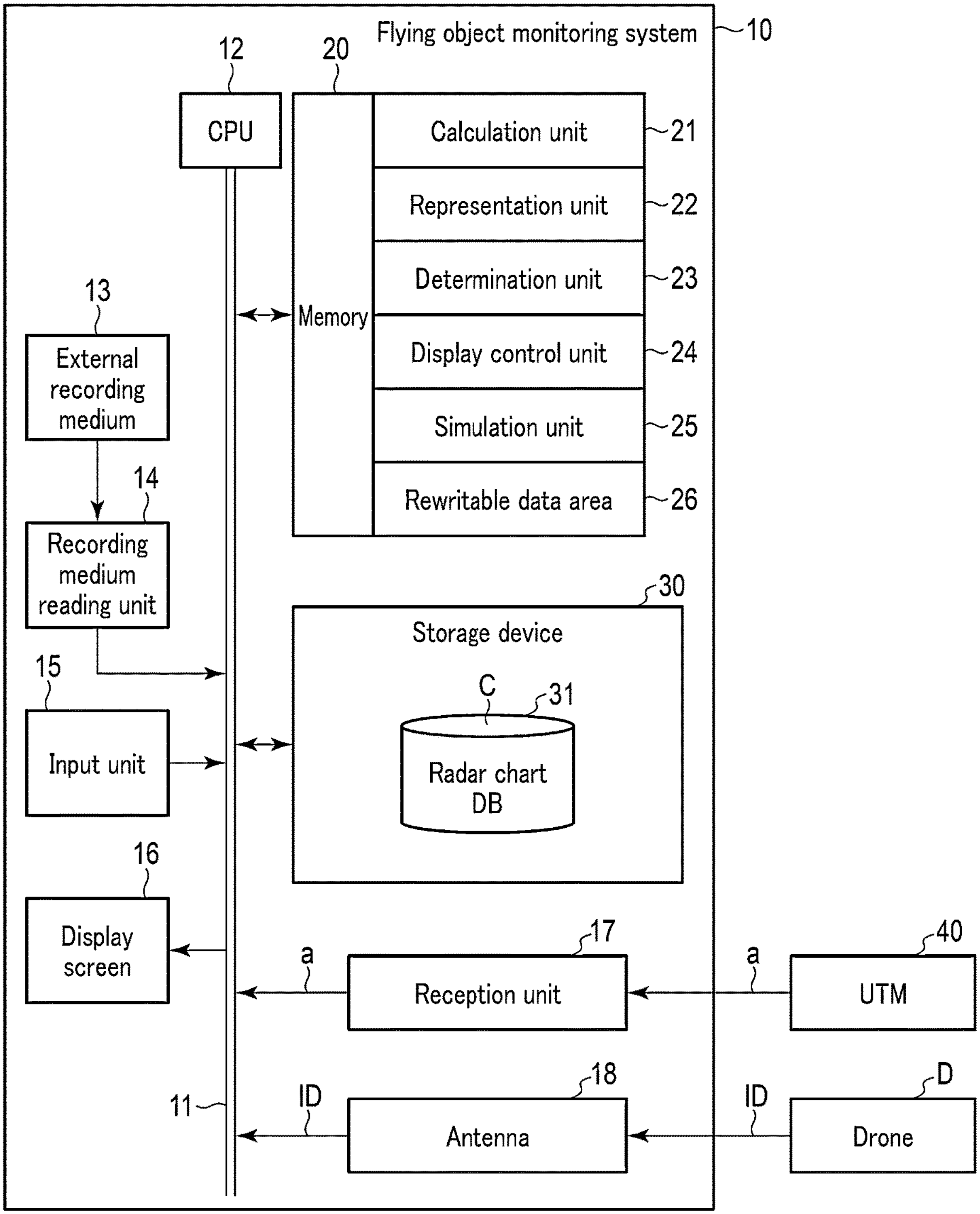
FIG. 1 is a block diagram showing a configuration example of a flying object monitoring system according to a first embodiment.

Embodiments will be described below with reference to the accompanying drawings. The drawings are schematic or conceptual. The relationship between the thickness and width of each of the components or the size ratio between the components in the drawings is not always the same as the actual one. The components shown in the drawings may be different in dimension or ratio even though they are the same. In the following descriptions and the accompanying drawings, the same components are denoted by the same numeral or sign and their detailed or overlapping descriptions will be omitted when necessary.

According to an embodiment, a flying object monitoring system comprises a reception unit which receives flight information of a flying object, a calculation unit which calculates acceleration in each flight direction of the flying object from the flight information, a representation unit which represents the calculated acceleration with an acceleration distribution image formed by plotting the calculated acceleration with respect to the flight direction, and a determination unit which determines whether the flying object is malfunctioning based on the acceleration distribution image.

First Embodiment

A first embodiment of the present invention will be described first.

FIG. 1 is a block diagram showing a configuration example of a flying object monitoring system according to the first embodiment.

The flying object monitoring system 10 of the first embodiment includes a CPU 12, a recording medium reading unit 14, an input unit 15, a display screen 16, a reception unit 17, an antenna 18, a memory 20 and a storage device 30, which are connected to each other by a bus 11.

In the first embodiment, the flying object will be described as a drone, but the drone is an example, and the flying object is not necessarily limited to a drone as long as it can be flown by remote control.

The CPU 12 is a computer to control the operation of each unit in the flying object monitoring system 10 according to various programs stored in the memory 20.

The input unit 15 may be a keyboard, a mouse, a track board or the like. The user can input necessary operation information to the flying object monitoring system 10 through the input unit 15.

The display screen 16 displays image information provided by the flying object monitoring system 10. The display screen 16 may be a display such as a liquid crystal display. The liquid crystal display may be one with a touch panel function. The touch panel function allows both the input unit 15 and the display screen 16 to be implemented.

The reception unit 17 receives flight information a of a drone from the UTM 40 via a communication network such as the Internet, and outputs the received flight information a to the memory 20. As described above, the flight information a includes flightable airspace information, manned aircraft air traffic control system information, aircraft information of drones in flight, operator information, position information of drones in flight, incident information of drones, accident information, weather information and map information.

The antenna 18 receives remote ID continuously from a drone D in flight and outputs the received remote ID to the memory 20. As described above, the remote ID includes a registration number, a product serial number, position information such as latitude and longitude, speed, an altitude and time.

Note that the foregoing configuration including the reception unit 17 and the antenna 18 is an example. The drone D in flight may transmit the remote ID (simply referred to as "ID" in FIG. 1) continuously to the UTM 40, and the reception unit 17 may receive both the flight information a of the drone in flight and the remote ID from the UTM 40. In this case, the antenna 18 can be excluded.

The storage device 30 includes a solid state drive (SSD), a hard disk drive (HDD) and the like to store a radar chart database 31 to be described later.

The memory 20 stores various programs for implementing the flying object monitoring system 10. The programs allow a calculation unit 21, an representation unit 22, a determination unit 23, a display control unit 24 and a simulation unit 25 to be implemented.

The programs for implementing the calculation unit 21, representation unit 22, determination unit 23, display control unit 24 and simulation unit 25 may be stored in the memory 20 in advance or may be read from an external recording medium 13 such as a memory card through a recording medium reading unit 14 and then stored in the memory 20. The programs cannot be rewritten.

In the memory 20, a writable data area 26 is secured as an area for storing rewritable data in addition to the area in which no data can be rewritten by the user.

The calculation unit 21 calculates acceleration b for each flight direction of the drone D using the flight information a and the information included in the remote ID.

The representation unit 22 represents acceleration b for past several seconds, calculated by the calculation unit 21 in each flight direction of the drone D as a radar chart image formed by plotting the acceleration b with respect to the flight direction in the horizontal plane. That is, the radar chart image is an acceleration distribution image representing an acceleration distribution.

Figure 2C:
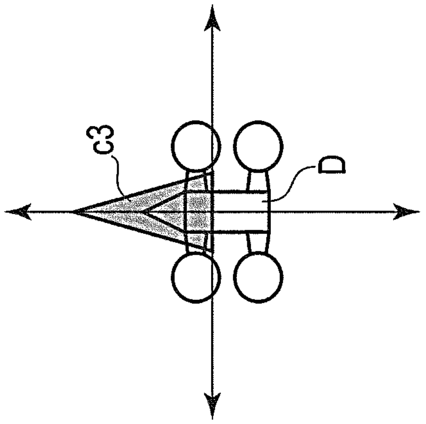
FIGS. 2A to 2C are schematic diagrams showing representation examples of a radar chart image.
Figure 2B:
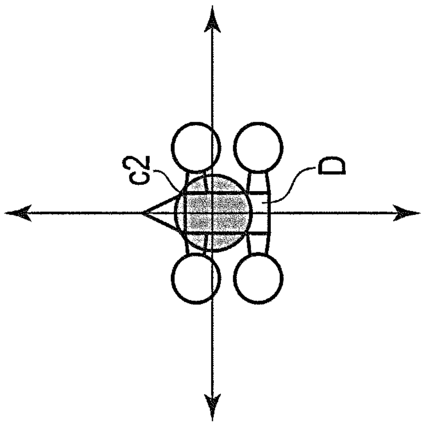
Figure 2A:
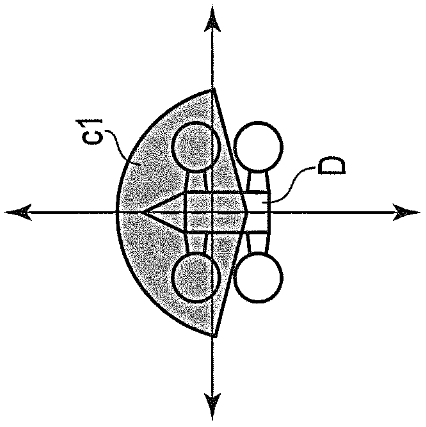

FIGS. 2A to 2C are schematic diagrams showing representation examples of the radar chart image.

FIG. 2A to 2C each show arrows extending in four directions between which an angle of 90° is formed, with the traveling direction of the drone D in the horizontal plane at 0°. As shown in FIG. 2A to 2C, radar chart images c1, c2 and c3 (which may collectively be referred to as "a radar chart image c" hereinafter) are formed by plotting the acceleration b for each flight direction of the drone D calculated by the calculation unit 21 with respect to the flight direction in the horizontal plane. The radar chart image c thus formed is superimposed on the icon of the drone D by the representation unit 22 and displayed on the display screen 16.

Note that FIG. 2A to 2C do not show the arrows indicating the acceleration in the vertical direction, which is the altitude direction, but the representation unit 22 represents the radar chart image c at different densities in accordance with the magnitude of the acceleration in the vertical direction, and can display it on the display screen 16.

Figure 3A:
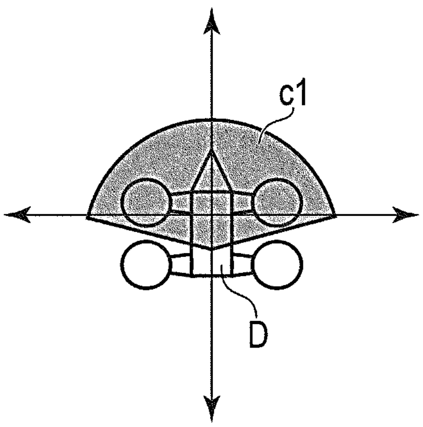
FIGS. 3A and 3B are schematic diagrams showing examples of a radar chart image represented at different densities in accordance with the magnitude of acceleration in the vertical direction.
Figure 3B:
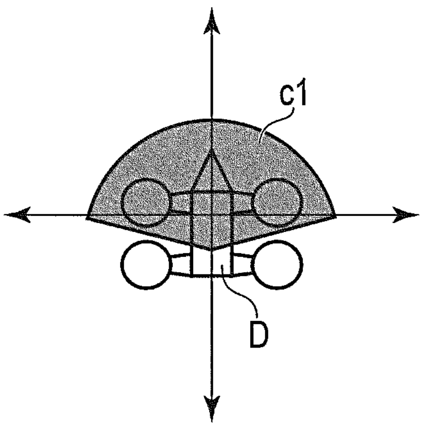

FIGS. 3A and 3B are schematic diagrams showing examples of the radar chart image represented at different densities in accordance with the magnitude of the acceleration in the vertical direction.

In the case of the drone D which is not moving stably but flying unsteadily, a radar chart image c1 having a large display area in the horizontal direction is formed, as shown in FIG. 2A. In addition, as the vertical acceleration of the drone D is lower, the radar chart image c1 is displayed thinly as shown in FIG. 3A, and as it is higher, the radar chart image c1 is displayed thickly as shown in FIG. 3B.

In the case of the drone D that is hovering in the vertical direction, a radar chart image c2 which is round and whose display area is small is formed, as shown in FIG. 2B. The radar chart image c2 is also displayed thinly as the vertical acceleration of the drone D is lower, and it is displayed thickly as the vertical acceleration is higher.

In the case of the drone D that is flying straight in the horizontal direction, a radar chart image c3 which has an acute apex in the straight-flying direction and whose shape is, for example, an isosceles triangle is formed, as shown in FIG. 2C. The radar chart image c3 is also displayed thinly as the vertical acceleration of the drone D is lower, and displayed thickly as the vertical acceleration is higher.

The determination unit 23 determines whether or not the drone D is malfunctioning based on the radar chart image c as shown in FIGS. 2A to 2C and 3A and 3B.

The determination unit 23 can first determine a malfunctioning drone from the density of the radar chart image c. Specifically, if the radar chart image c is thick, its corresponding drone D can be determined as a malfunctioning one. This is because a high vertical acceleration means a high risk of a crash.

Note that the user can optionally or empirically determine a value of the vertical acceleration that is the boundary between malfunctioning and non-malfunctioning. Thus, the determination unit 23 determines that the drone D is malfunctioning based on the radar chart image c that is formed more thickly than the image corresponding to the boundary acceleration. On the other hand, the determination unit 23 determines that the drone D is not malfunctioning based on the radar chart image c that is formed thinner than the image corresponding to the boundary acceleration.

The determination unit 23 can also determine whether the drone D is malfunctioning from the shape of the radar chart image c. For this determination, the determination unit 23 compares the shape of the radar chart image c represented by the representation unit 22 with the shape of a radar chart image C for comparison. Since the radar chart image c is used to determine whether or not the drone D is malfunctioning as described above, the radar chart image formed by the representation unit 22 is also referred to as a malfunction display image in the present specification.

The radar chart image C for comparison is stored in the radar chart database 31 included in the storage device 30. In the radar chart database 31, a radar chart image indicating a malfunctioning drone and a radar chart image indicating a non-malfunctioning drone are stored as the radar chart image C for comparison. In addition, the radar chart image c determined by the determination unit 23 in the past is also stored as the radar chart image C for comparison in association with a result of the determination of a malfunctioning drone or a non-malfunctioning drone.

Like a malfunction display image c1, a radar chart image having a large display area in the horizontal direction means that the drone D is not moving stably but flying unsteadily. This radar chart images are stored in association with malfunctions.

The determination unit 23 compares the shape of the radar chart image c, that is, the shape of the malfunction display image c, with the shape of the radar chart image C stored in the radar chart database 31. If the radar chart image C that is similar in shape to the malfunction display image c is associated with malfunctions, the determination unit 23 determines that the corresponding drone D is malfunctioning. If it is associated with non-malfunctions, the determination unit 23 determines that the drone D is not malfunctioning.

If the radar chart data base 31 does not store a radar chart image C that is similar in shape to the malfunction display image c, the determination unit 23 determines whether the drone D is malfunctioning based on the result of simulation by the simulation unit 25.

The simulation unit 25 simulates the trajectory of the drone D using the flight information a of the drone D and the remote ID. Then, the determination unit 23 can determine that the drone D is malfunctioning if there is an unnatural movement in the trajectory obtained by the simulation, and can determine that the drone D is not malfunctioning if there is no unnatural movement.

As described above, the determination unit 23 determines whether the drone D is malfunctioning or not. Then, the determination unit 23 associates the malfunction display image c with the determination result and stores it in the radar chart database 31 as a new radar chart image C for comparison.

Note that the determination unit 23, into which AI is incorporated, may determine whether the shape of the malfunction display image c is similar to that of the radar chart image C using the AI.

Figure 4:
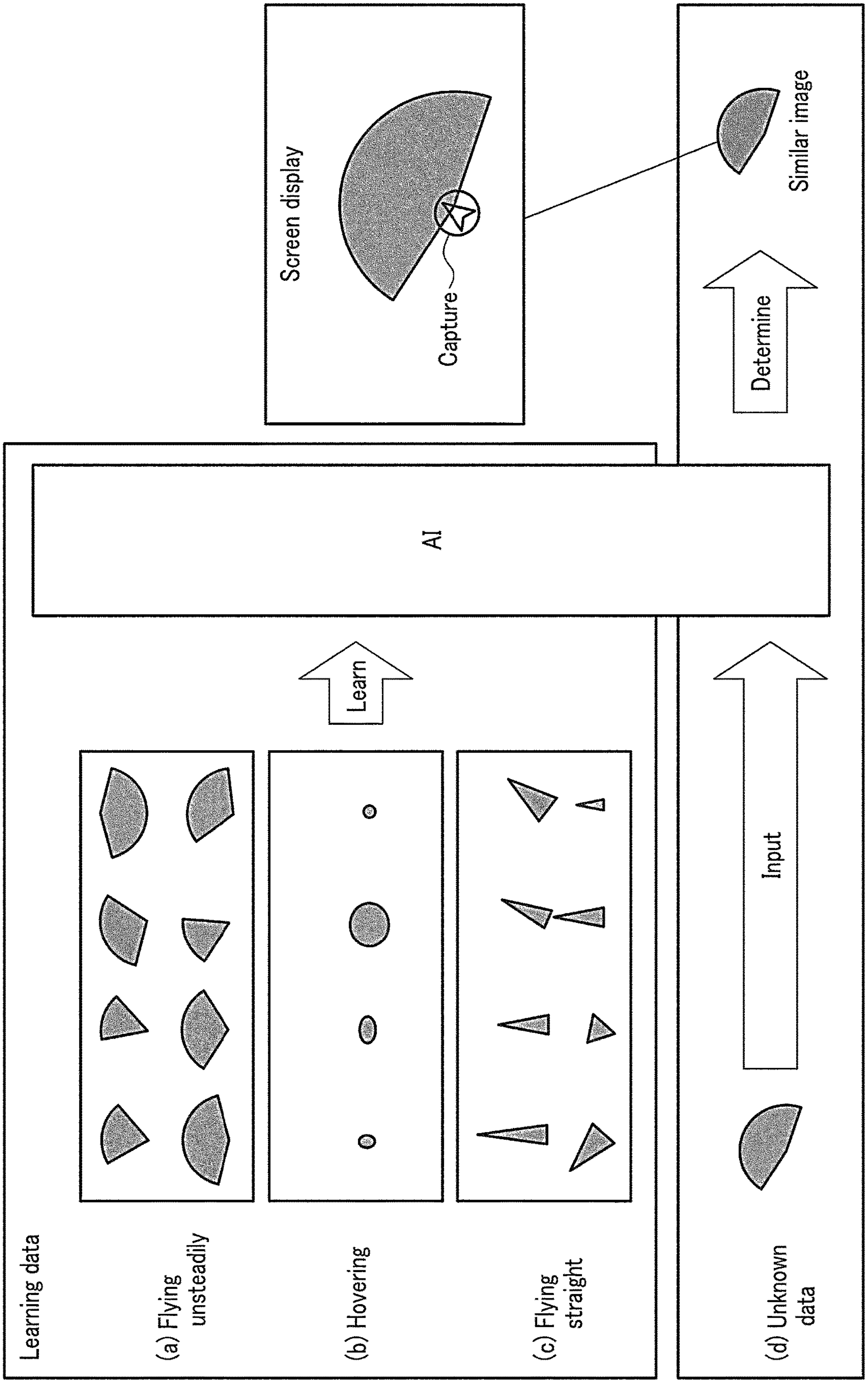
FIG. 4 is a diagram illustrating an example of similarity determination using AI.

An example of similarity determination using AI will be described with reference to FIG. 4.

As described above, the radar chart database 31 stores a radar chart image indicating a malfunctioning drone and a radar chart image indicating a non-malfunctioning drone in association with a determination result, that is, in association with whether the drone is malfunctioning or non-malfunctioning.

More specifically, the radar chart database 31 stores a radar chart image c1 of a drone "flying unsteadily" as described with reference to FIG. 2A, a radar chart image c2 of a drone "hovering" as described with reference to FIG. 2B, a radar chart image c3 of a drone "flying straight" as described with reference to FIG. 2C, and the like in association with whether the drone is malfunctioning or non-malfunctioning.

The radar chart images stored in the radar chart database 31 are learned as learning data in advance by AI.

If an unknown malfunction display image (d) is input to the AI thus learned, the AI outputs an image similar to the unknown malfunction display image (d). If the similar image indicates a malfunctioning drone, the determination unit 23 can determine the drone D corresponding to the unknown malfunction display image (d) as a malfunctioning drone. Conversely, if the similar image indicates a non-malfunctioning drone, the determination unit 23 can determine the drone D corresponding to the unknown malfunction display image (d) as a non-malfunctioning drone.

Next is a description of the display control unit 24.

Figure 5:
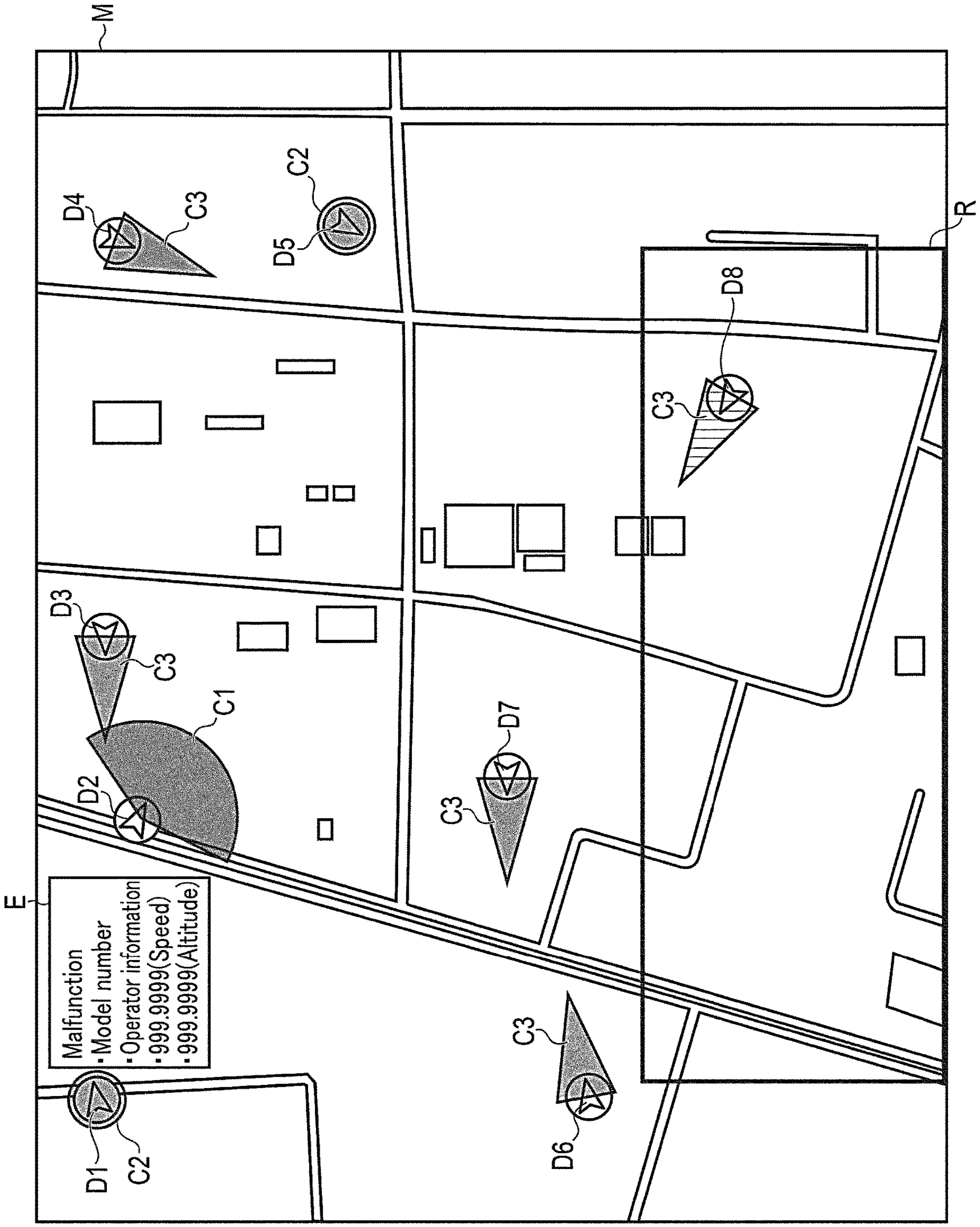
FIG. 5 is a diagram showing an example of a map screen on which drone icons are superimposed on malfunction display images in the first embodiment.

FIG. 5 is a diagram showing an example of a map screen on which icons of the drones D are superimposed on the malfunction display image c in the first embodiment.

As shown in FIG. 5, the display control unit 24 locates icons of the drones D on which the malfunction display image c whose density corresponds to the vertical acceleration are superimposed on a map determined based on the flight information a of the drones D and the remote ID, and displays the icons on the display screen 16.

On the map M illustrated in FIG. 5, icons of eight drones D1 to D8 are displayed. The locations of the icons of the drones D1 to D8 on the map M correspond to the locations determined based on the flight information a and remote ID of each of the drones D1 to D8. The map M may or may not be an aerial photo.

The malfunction display images c represented for the drones D1 to D8 are superimposed on their respective icons of the drones D1 to D8. Each of the malfunction display images c is formed with a density corresponding to the vertical acceleration.

A malfunction display image c2 as shown in FIG. 2B is thinly formed and superimposed on the drones D1 and D5, for example. This thin malfunction display image c2 allows the user to recognize that the drone D1 is a non-malfunctioning drone that is slowly hovering.

A malfunction display image c3 as shown in FIG. 2C is also thinly formed and superimposed on the drones D3, D4, D6 and D7. This thin malfunction display image c3 allows the user to recognize that the drones D3, D4, D6 and D7 are non-malfunctioning drones that are flying straight without a large acceleration in the vertical direction.

A malfunction display image c1 as shown in FIG. 2A is thickly formed and superimposed on the drone D2. This thick malfunction display image c1 allows the user to recognize that the drone D2 is a malfunctioning drone that is flying unsteadily with a large acceleration in the vertical direction. As for the drone D2 determined as a malfunctioning one, detailed information E indicating "malfunctioning (capture)," "model number," "operator information" "speed" and "altitude" is also displayed near the icon of the drone D2 on the map M. Thus, the user can obtain detailed information about the drone D2 in addition to the determination result that the drone D2 is a malfunctioning drone.

In addition, the drone D8 enters a no-entry area R. The no-entry area R is an entry restricted or prohibited area such as government agencies, private property, military facilities, and airports. The determination unit 23 determines, based on the flight information a, that the drone D that has entered the no-entry area R is a suspicious drone to be captured regardless of whether it is malfunctioning or not. Note that since the no-entry area R is predetermined, the determination unit 23 can immediately identify the drone D, which has approached/entered the no-entry area R, as a suspicious drone from the position information of the drone D.

Note that the determination unit 23 also determines, as a suspicious drone, a drone whose aircraft registration has not been made, a drone that is prohibited from flying due to an incident or the like, and a drone that transmits no remote ID. These drones to be determined as suspicious ones can easily be detected by checking the UTM and remote ID information.

The display control unit 24 changes the color of the malfunction display image c of the drone D determined as a suspicious one by the determination unit 23 to a clear color such as red (hatched in FIGS. 5 and 6), and displays the image on the display screen 16. The display control unit 24 may highlight not only the image c but also the detailed information E by displaying it in a clear color such as red, displaying it in bold, displaying it in a font such as italic, or the like.

Figure 6A:
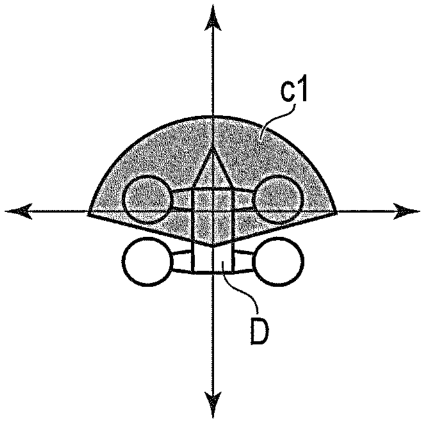
FIGS. 6A and 6B are diagrams showing a change in the color of a malfunction display image from a malfunctioning drone to a suspicious drone.
Figure 6B:
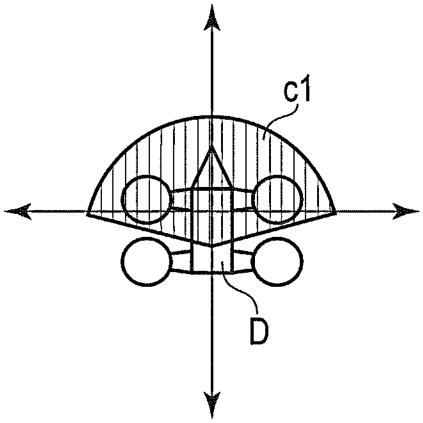

Thus, the user can immediately recognize a suspicious drone by viewing, for example, the malfunction display image c whose color is changed to red and/or the detailed information E from the display screen 16. For example, as illustrated in FIG. 6A, the user can immediately recognize that the drone D has changed from a malfunctioning drone to a suspicious drone by viewing on the display screen 16 a change the color of the malfunction display image c1 superimposed on the icon of the drone D determined as a malfunctioning one to, for example, red as illustrated in FIG. 6B.

Since the drone D8 shown in FIG. 5 enters the no-entry area R and is determined as a suspicious one, the malfunction display image c3 is displayed in red, for example, on the display screen 16.

Since all suspicious drones are to be captured, the user can immediately proceed to capture them.

As a specific method of capturing a suspicious drone, for example, as disclosed in Patent Literature 3, there are methods using noise radio waves to be transmitted, using a net for capture, using a drone for capture (counter drone), and the like. If, therefore, the flying object monitoring system 10 of the first embodiment is incorporated into the system disclosed in Patent Literature 3, a malfunctioning drone and a suspicious drone can quickly be found and captured.

As described above, in the flying object monitoring system 10, hardware of the bus 11, CPU 12, recording medium reading unit 14, input unit 15, display screen 16, reception unit 17, antenna 18, memory 20, storage device 30 and the like, and software of the programs stored in the memory 20 operate in cooperation with each other.

Next is a description of an operation example of the flying object monitoring system of the first embodiment configured as described above.

Figure 7:
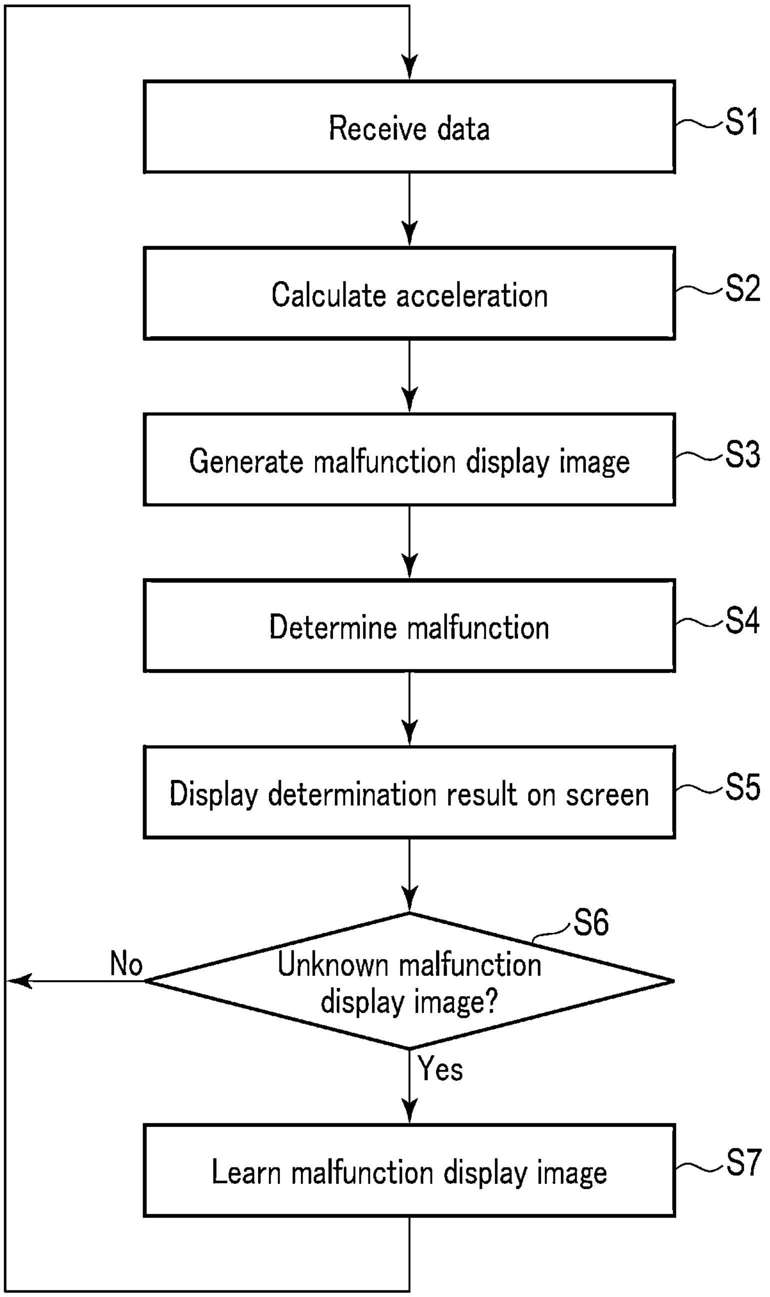
FIG. 7 is a flowchart showing an operation example of the flying object monitoring system according to the first embodiment.

FIG. 7 is a flowchart showing an operation example of the flying object monitoring system of the first embodiment.

In step S1, data relating to the drone D, such as the flight information a of the drone D and the remote ID, is received. More specifically, the flight information a of the drone D is received by the reception unit 17 from the UTM 40 and the remote ID is received by the antenna 18 from the drone D in flight. Note that when the drone D in flight transmits the remote ID to the UTM 40, the reception unit 17 receives both the flight information a of the drone in flight and the remote ID from the UTM 40.

In step S2, the calculation unit 21 calculates the acceleration of the drone D. This calculation is performed by the calculation unit 21 calculating acceleration b of the drone D in each flight direction using information included in the flight information a and the remote ID.

In step S3, the representation unit 22 generates a malfunction display image c of the drone D. The malfunction display image c is formed by plotting the acceleration b in the past few seconds in each flight direction of the drone D with respect to the flight direction in the horizontal plane. That is, the malfunction display image is a radar chart image c indicating the acceleration distribution of the drone D. In addition, the malfunction display image c is thinly formed as the vertical acceleration of the drone D is lower, and is thickly formed as the vertical acceleration is higher.

In step S4, the determination unit 23 determines whether the drone D is malfunctioning or not based on the malfunction display image c.

First, if the malfunction display image c is formed thicker than the color corresponding to the boundary acceleration that is a boundary between malfunction and not-malfunction, the determination unit 23 determines that the corresponding drone D is malfunctioning.

The determination unit 23 further determines whether the drone D is malfunctioning or not from the shape of the malfunction display image c. For this determination, the determination unit 23 compares the shape of the malfunction display image c with that of the radar chart image C stored in the radar chart database 31. Then, the determination unit 23 determines that the drone D is malfunctioning if the radar chart image C that is similar in shape to the malfunction display image c is associated with malfunction, and it determines that the drone D is not malfunctioning if the radar chart image C is associated with non-malfunction. Note that that the determination unit 23 can use AI to determine whether or not the shape of the malfunction display image c is similar to that of the radar chart image C.

If the radar chart data base 31 stores no radar chart image C that is similar in shape to the malfunction display image c, the determination unit 23 determines whether the drone D is malfunctioning or not based on the result of simulation of the simulation unit 25.

In step S5, as illustrated in FIG. 5, the health check result of each drone D in flight is visualized and displayed on the display screen 16.

Viewing the screen as illustrated in FIG. 5 allows the user to easily grasp the state of each drone D in flight.

In step S6, if an unknown malfunction display image c is displayed in the image illustrated in FIG. 5 (Yes in S6), the process proceeds to step S7, and if not (No in S6), the process returns to step S1.

The determination unit 23 can also use AI to learn an unknown malfunction display image c in step S7. After step S7, the process returns to step S1.

As described above, according to the flying object monitoring system 10 of the first embodiment, the state of a drone D that may be malfunctioning can be visualized from public information about the flight of the drone D and displayed on a map. In addition, a suspicious drone can be found and displayed on a map.

Since, furthermore, AI can be used to determine a malfunctioning drone, its learning effect can increase the accuracy of determination of the malfunctioning drone.

As is seen from the above, a user can easily find a malfunctioning drone and a suspicious drone. Therefore, the flying object monitoring system 10 of the first embodiment is incorporated into the system disclosed in Patent Literature 3, a malfunctioning drone and a suspicious drone can quickly be found and captured.

Second Embodiment

Next is a description of a second embodiment of the present invention.

The flying object monitoring system of the second embodiment is a modification to the flying object monitoring system of the first embodiment, and is configured as shown in FIG. 1.

Therefore, in the second embodiment, elements different from those of the first embodiment will be described, and the same elements have been described and thus their descriptions will be omitted.

In addition to the description of the first embodiment, in the second embodiment, the determination unit 23 determines whether the drone D is malfunctioning or not based on the flight information a, and if the determination unit 23 determines that the drone D is malfunctioning, it further assumes the reason for the malfunctioning. The reason for determining that the drone is malfunctioning is, for example, an interruption of communication with the operator; however, the reason is not limited to the interruption.

The flight information a from the UTM 40 does not include information on the health state of the drone D. That is, the flight information a from the UTM 40 does not include information on the interruption of communication with the drone D. It is thus impossible to directly determine the state of the interruption of communication with the drone D from the flight information a.

If communication is interrupted, the drone D cannot receive any instructions from the operator. Thus, even before the drone D arrives at a predetermined destination, it only hovers at the place where communication is interrupted as if a lost person were looking around, with the result that the flight speed is significantly lowered.

The UTM 40 grasps the position of the drone D based on the remote ID continuously transmitted from the drone D. Accordingly, the flight speed of the drone D is calculated based on the position information continuously transmitted from the drone D, and the calculated flight speed is included in the flight information a and then transmitted to the flying object monitoring system 10A.

The flight information a is received by the reception unit 17. If the flight information a indicates that the flight speed has significantly lowered before the drone D arrives at its destination, the determination unit 23 assumes that an interruption has occurred in communication with the drone D. Thus, the determination unit 23 can indirectly assume the interruption of communication with the drone D based on the flight information a. The determination unit 23 determines that the drone D assumed to be interrupted in communication is malfunctioning.

Since, as described above, the drone D whose communication is interrupted is hovering at the place where the communication interruption has occurred, its propelling force is lost in the flying direction. For this reason, the drone D may deviate from the flight path (airspace) scheduled in advance due to the wind.

The UTM 40 grasps the flight path of the drone D. Also, the UTM 40 always grasps the position of the drone D based on the remote ID transmitted from the drone D. If, therefore, the drone D deviates significantly (by 40 m or more, for example) from the flight path scheduled in advance, the UTM 40 includes the fact in the flight information a and transmits it to the flying object monitoring system 10, based on the position information continuously transmitted from the drone D.

The drone D that has significantly deviated from its flight path scheduled in advance cannot be distinguished from a drone that has deviated simply due to malfunction without malice or a dangerous drone that has deviated intentionally with malicious intent. Therefore, the drone D that has significantly deviated from the flight path scheduled in advance needs to be captured regardless of whether the deviation is due to malicious intent.

If the flight information a includes information indicating that the drone D significantly deviates from the flight path, the determination unit 23 determines that the drone D is a suspicious drone to be captured.

In addition, as described in the first embodiment, the drone D that has entered a predetermined no-entry area R should be captured as a suspicious drone D regardless of the occurrence of communication interruption.

The determination unit 23 recognizes the position of the drone D from the flight information a, and determines that the drone D is a suspicious one to be captured if the recognized position is within the predetermined no-entry area R.

Figure 8:
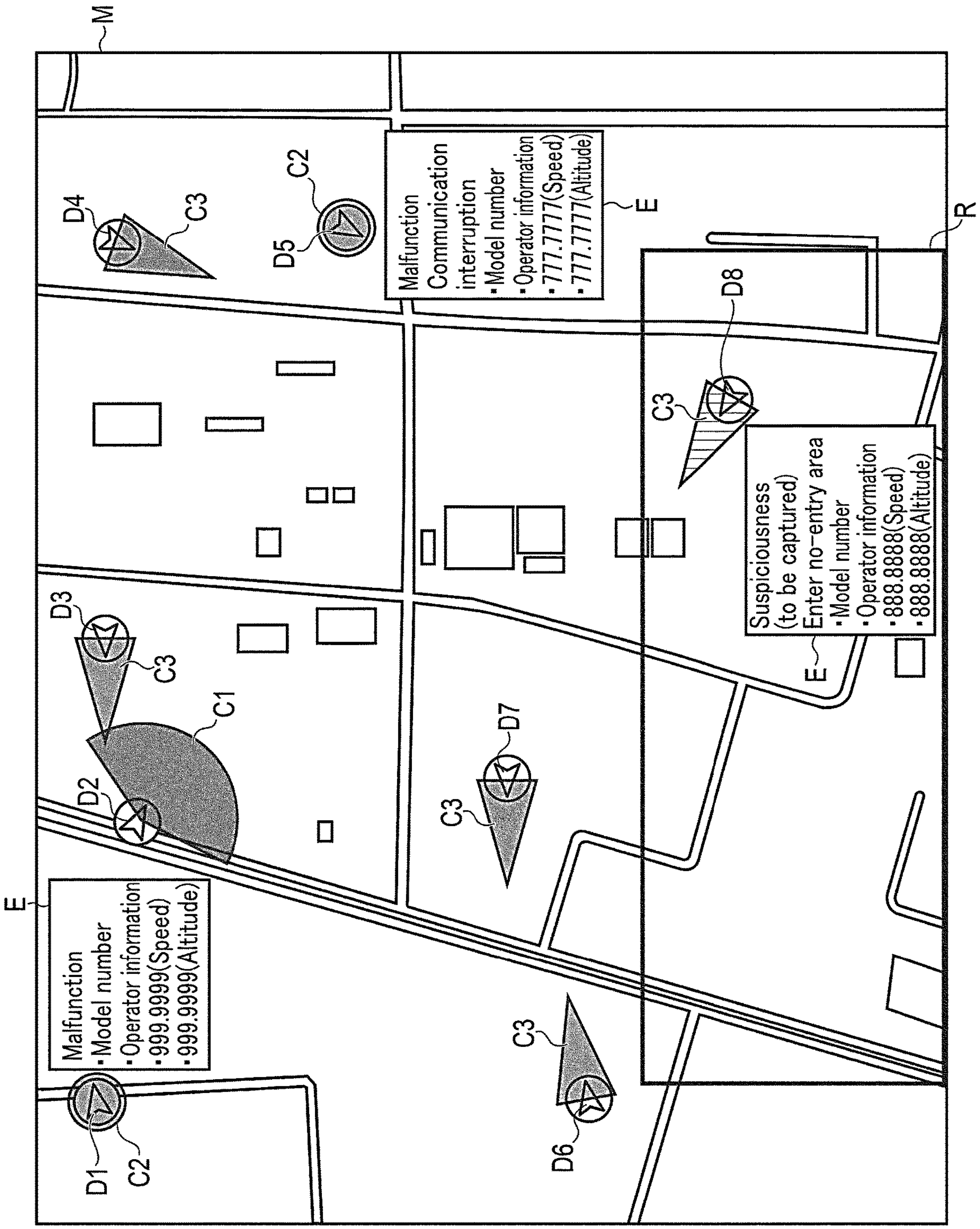
FIG. 8 is a diagram showing an example of a map screen on which icons of a drone determined as malfunctioning or suspicious one and detailed information are located in a second embodiment.

FIG. 8 is a diagram showing an example of a map screen on which icons of drones determined as malfunctioning or suspicious ones and detailed information are located in the second embodiment.

As described in the first embodiment, the display control unit 24 can locate the icon of the drone D, on which the malfunction display image c formed with the density corresponding to the vertical acceleration is superimposed, at a position on the map determined based on the flight information a of the drone D and the remote ID, and display the icon on the display screen 16. In the second embodiment, the display control unit 24 further causes the display screen 16 to display detailed information E including character information indicating a result of the determination of the determination unit 23 close to the icon of the drone D.

The result of determination result is, for example, "malfunctioning" and "suspicious." In addition, the detailed information E may include, in addition to the result of determination, specific information indicating the basis of the result of determination, such as "communication interruption." The detailed information E may also include supplementary information such as a model number, operator information, speed and an altitude, as has been described with reference to FIG. 5.

The display control unit 24 can highlight the characters in the detailed information E of the drone D determined by the determination unit 23 as a "malfunctioning" or "suspicious" drone on the display screen 16 by displaying them in a clear color such as red, displaying them in bold, displaying them in a font such as italic, or the like. The display control unit 24 can also highlight the icon of the drone D determined as a "malfunctioning" or "suspicious" drone by the determination unit 23 on the display screen 16 by displaying the icon in a clear color such as red, by blinking, or the like. The display control unit 24 may also display the icon and detailed information of a malfunctioning drone and the icon and detailed information of a suspicious drone in different colors.

Viewing the foregoing map information allows the user to easily recognize the occurrence and location of a drone determined as a "malfunctioning" or "suspicious" one. Adding specific information indicating the basis of a result of determination, such as "communication interruption" to the detailed information E makes it possible to grasp more specific information about a malfunctioning or suspicious drone. Displaying the icon and detailed information of a malfunctioning drone and the icon and detailed information of a suspicious drone in different colors makes it possible to distinguish a malfunctioning drone and a suspicious drone.

Figure 9:
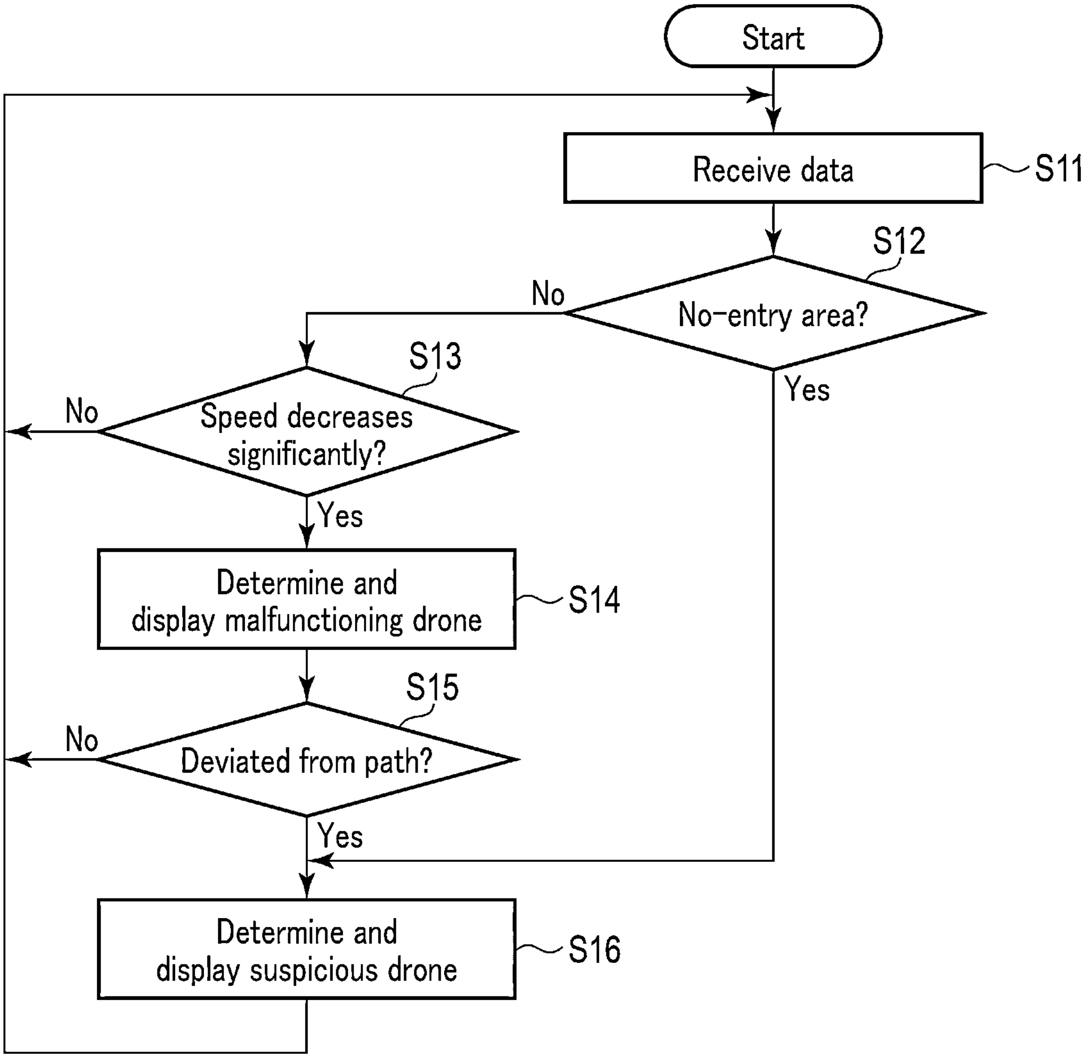
FIG. 9 is a flowchart showing an operation example of a flying object monitoring system according to the second embodiment.

Next is a description of an operation example of the flying object monitoring system of the second embodiment configured as described above. FIG. 9 is a flowchart showing an operation example of the flying object monitoring system of the second embodiment.

First, as in step S1 shown in FIG. 7, data related to the drone D such as the flight information a of the drone D and the remote ID are continuously received (S11).

The determination unit 23 recognizes the position of the drone D from the flight information a, and if the recognized position is within a no-entry prohibited area R designated in advance (Yes in S12), it determines that the drone D is a suspicious drone to be captured (S16).

The position of a drone determined as a suspicious one is determined by the display control unit 24 based on the flight information a and the remote ID, and an icon indicating the drone is located on the map and displayed on the display screen 16. On the display screen 16, detailed information E about the drone is also displayed close to the icon of the drone. The detailed information E is highlighted by displaying it in a clear color such as red, displaying it in bold, displaying it in a font such as italic, and the like.

Viewing the above map information allows the user to easily recognize the "suspicious" drone and its position. Referring to the detailed information E makes it possible to grasp more specific information concerning the suspicious drone.

Even though it is determined in step S12 that a drone D is not within the no-entry area R (No in S12), if communication with the drone D is interrupted, the drone D hovers at the place where the communication is interrupted, thus decreasing the flight speed of the drone D significantly (Yes in S13).

If the flight information a indicates that the flight speed has significantly decreased as described above, the determination unit 23 assumes that a communication interruption has occurred in the drone D and determines that the drone D is a malfunctioning one (S14).

The position of a drone determined as a malfunctioning one is also determined by the display control unit 24 based on the flight information a and the remote ID, and an icon indicating the drone is located on the map and displayed on the display screen 16. On the display screen 16, detailed information E about the drone is also displayed close to the icon of the drone. The detailed information E is highlighted by displaying it in a clear color such as red, displaying it in bold, displaying it in a font such as italic, and the like.

Viewing the above map information allows the user to easily recognize the "malfunctioning" drone and its position. Referring to the detailed information E makes it possible to grasp more specific information concerning the malfunctioning drone.

Since, as described above, the drone D whose communication is interrupted hovers at the place where the communication interruption has occurred, its propelling force is lost in the flying direction. For this reason, the drone D may deviate from the flight path (airspace) scheduled in advance due to the wind. The drone D that has significantly deviated from its flight path cannot be distinguished from a drone that has deviated simply due to malfunction without malice or a dangerous drone that has deviated intentionally with malicious intent. Therefore, the drone D that has significantly deviated from the flight path scheduled in advance is treated as a suspicious drone to be captured regardless of whether the deviation is due to malicious intent.

That is, if the flight information a includes information indicating that the drone has significantly deviated from its flight path, the determination unit 23 determines that the drone D is a suspicious drone (Yes in S15), and the process of the foregoing step S16 is performed.

If the flight speed does not significantly decrease in step S13 (No in S13) and if the drone does not deviate from its flight path in step S15 (No in S15), the process returns to step S11, and the process from step S12 to step S16 is repeated based on new flight information a.

As described above, according to the flying object monitoring system 10 of the second embodiment, a malfunctioning drone such as a drone whose communication is interrupted can be determined. In addition, the position of a malfunctioning drone can explicitly be shown on a map while displaying detailed information of the malfunctioning drone. Furthermore, the position of a suspicious drone that has entered a no-entry area or a suspicious drone that is a malfunctioning drone that has deviated from its flight path can clearly be shown on a map while displaying detailed information. In this case, the malfunctioning drone and the suspicious drone can be distinguished from each other to be grasped easily and reliably.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A flying object monitoring system comprising:

processing circuitry configured to receive flight information of a flying object continuously transmitted from the flying object;

calculate acceleration in each flight direction of the flying object from the flight information;

represent the calculated acceleration with an acceleration distribution image formed by plotting the calculated acceleration with respect to the flight direction; and determine whether the flying object is malfunctioning based on the acceleration distribution image, wherein the acceleration distribution image is a radar chart image formed by plotting the calculated acceleration in the flight direction, and the processing circuitry is configured to superimpose an icon indicating the flying object on the formed acceleration distribution image, which indicates a malfunctioning flying object when the flying object is determined as malfunctioning and indicates a non-malfunctioning flying object when the flying object is determined as non-malfunctioning, and display the superimposed icon at a position on a map determined based on the flight information of the flying object.

2. The flying object monitoring system of claim 1, wherein the processing circuitry compares the formed acceleration distribution image with the acceleration distribution images stored in a database to determine whether the flying object is malfunctioning.

3. The flying object monitoring system of claim 2, wherein the processing circuitry determines that the flying object is malfunctioning if the formed acceleration distribution image is similar to the acceleration distribution image indicating a malfunctioning flying object stored in the database.

4. The flying object monitoring system of claim 3, wherein the processing circuitry simulates a trajectory of the flying object based on the flight information, and determines whether the flying object is malfunctioning based on a result of the simulation if the formed acceleration distribution image is similar to neither of the acceleration distribution images stored in the database.

5. The flying object monitoring system of claim 4, wherein the processing circuitry causes the formed acceleration distribution image to be newly stored in the database as one of the acceleration distribution image indicating a malfunctioning flying object and the acceleration distribution image indicating a non-malfunctioning flying object in accordance with a result of determination based on the result of simulation.

* * * * *